United States Patent [19]

Perkins et al.

[11] Patent Number: 5,611,650
[45] Date of Patent: Mar. 18, 1997

[54] TOOLING PLATE MOUNTING ASSEMBLY WITH INTERLOCKING PINS

[75] Inventors: Richard W. Perkins, Van Nuys; Bradley L. Read, Los Angeles, both of Calif.

[73] Assignee: Laurence/Wayne, Van Nuys, Calif.

[21] Appl. No.: 515,622

[22] Filed: Aug. 16, 1995

[51] Int. Cl.$^6$ .................................................... B23Q 3/00
[52] U.S. Cl. ................ 408/87; 269/309; 248/346.03; 279/79; 403/324; 409/219
[58] Field of Search ................. 408/87, 103, 241 R; 269/309; 279/79, 87; 248/346.01, 346.02, 346.03; 409/174, 219; 403/322, 324, 326

[56] References Cited

U.S. PATENT DOCUMENTS

| | | | |
|---|---|---|---|
| 302,519 | 7/1884 | Parsons | 403/324 |
| 698,137 | 4/1902 | Porter | 403/324 |
| 2,590,548 | 3/1952 | Kopczynski | 279/79 |
| 3,376,764 | 4/1968 | Schardt | 248/346.01 |
| 4,021,056 | 5/1977 | Oakes . | |
| 4,191,395 | 3/1980 | Salomon . | |
| 4,316,618 | 2/1982 | Sampson . | |
| 4,480,364 | 11/1984 | Kosmowski | 408/87 |
| 4,786,216 | 11/1988 | Kitagawa et al. | 408/87 |
| 5,044,654 | 9/1991 | Meyer . | |
| 5,167,405 | 12/1992 | Cayley, Jr. | 269/309 |
| 5,279,053 | 1/1994 | Pallatin et al. . | |

*Primary Examiner*—Daniel W. Howell
*Attorney, Agent, or Firm*—Blakely Sokoloff Taylor & Zafman

[57] ABSTRACT

A mounting assembly that secures a tooling plate to a base plate. The base plate has a mounting aperture which receives a pin that extends from the tooling plate. The pin has a locking aperture located essentially perpendicular to the longitudinal axis of the pin. Located within the mounting aperture is an armature which has a lip that extends into the locking aperture when the tooling plate is placed onto the base plate and the pin is inserted into the mounting aperture. The interlocking armature and pin secure the tooling plate to the base plate. The pin and armature lip have cooperating chamfered cam surfaces that move the lip into the locking aperture when the pin is inserted into the mounting aperture. The assembly includes a spring biased button that can be depressed to move the armature out of the pin so that the tooling plate can be released from the base plate.

8 Claims, 2 Drawing Sheets

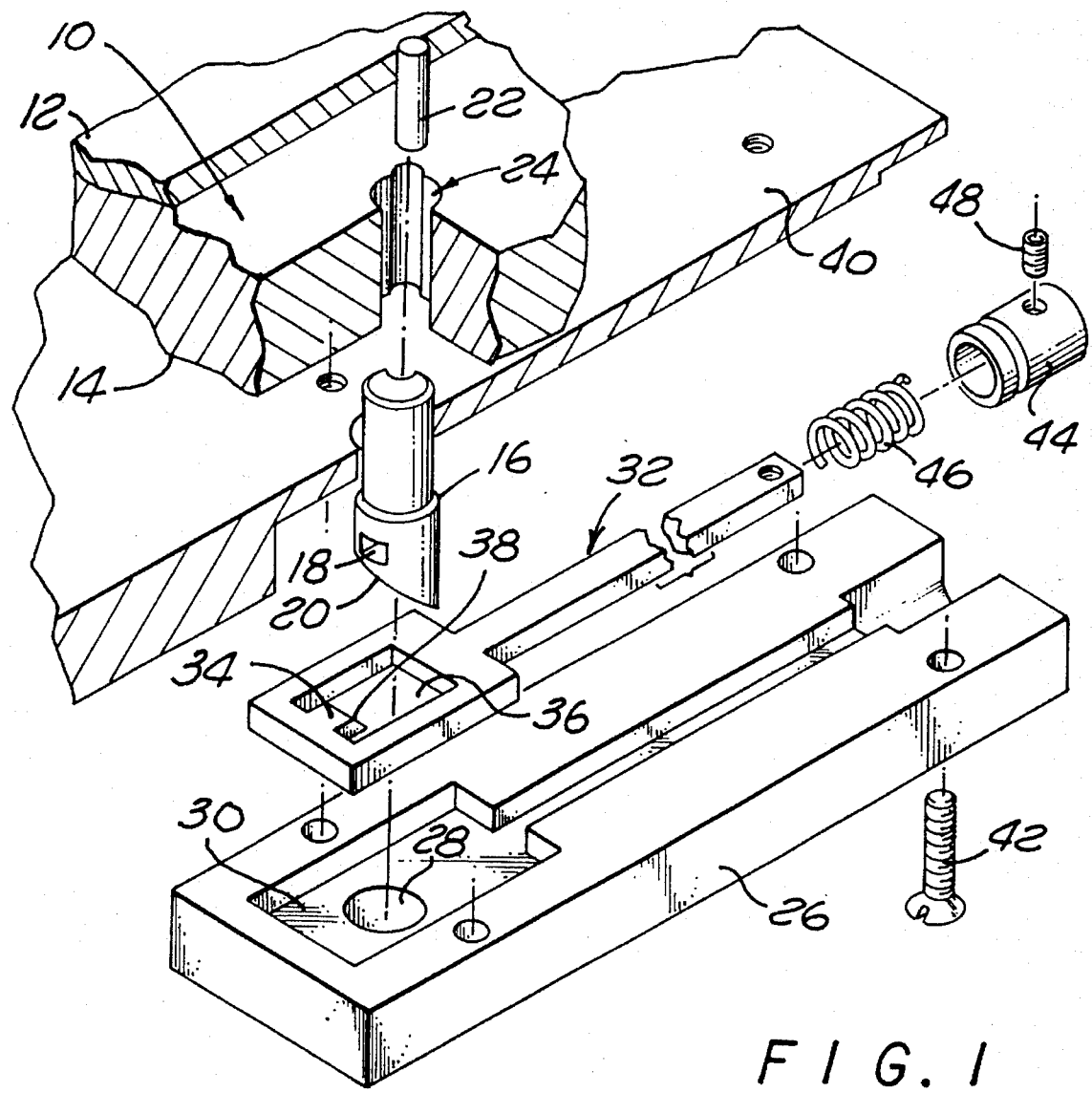
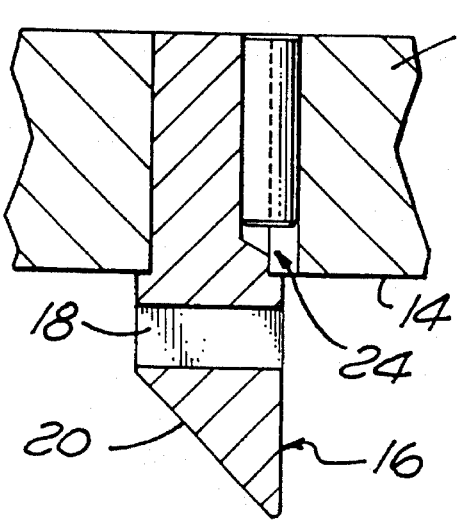
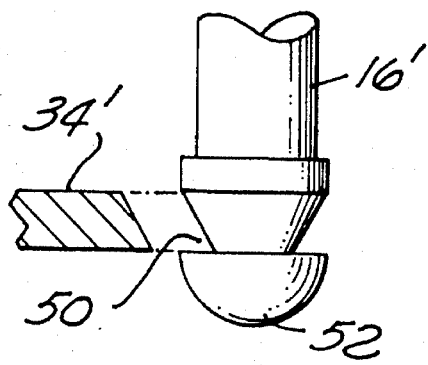
FIG. 1
FIG. 2
FIG. 5

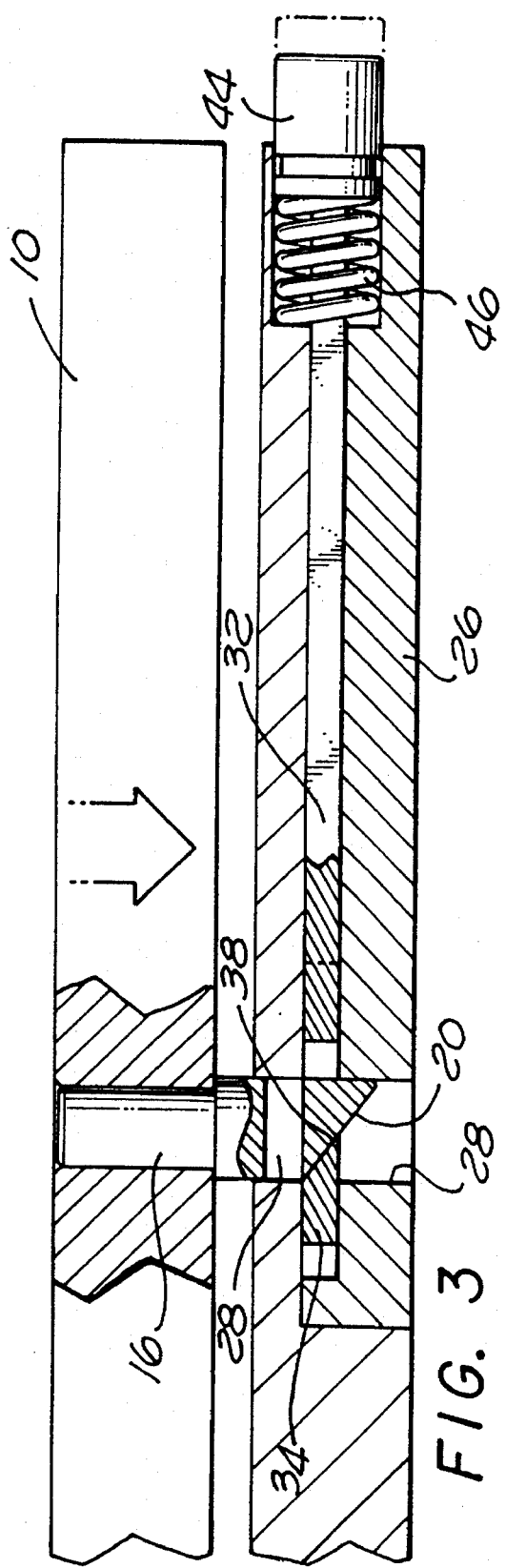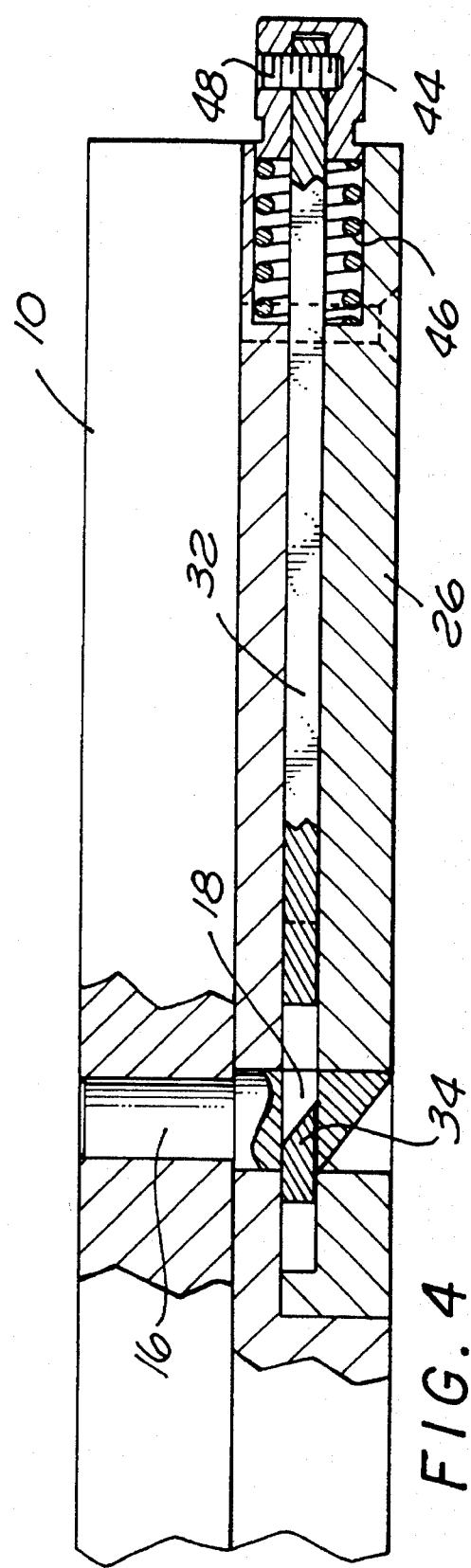

TOOLING PLATE MOUNTING ASSEMBLY WITH INTERLOCKING PINS

BACKGROUND OF THE INVENTION

1. FIELD OF THE INVENTION

The present invention relates to an assembly for mounting a tooling plate onto a base plate.

2. DESCRIPTION OF RELATED ART

During a manufacturing process components and other piece parts are commonly secured to a tooling plate. For example, printed circuit boards can be mounted to a tooling plate to drill holes through the board. To prevent movement of the circuit board, the tooling plate is typically fastened to a base plate. The tooling plate is typically attached to the base plate by clamps or tie-down bolts which require time and effort to secure and disengage. It would be desirable to provide a mounting assembly that would allow a tooling plate to be readily connected and disengaged from a base plate.

SUMMARY OF THE INVENTION

The present invention is a mounting assembly that secures a tooling plate to a base plate. The base plate has a mounting aperture which receives a pin that extends from the tooling plate. The pin has a locking aperture located essentially perpendicular to the longitudinal axis of the pin. Located within the mounting aperture is an armature which has a lip that extends into the locking aperture when the tooling plate is placed onto the base plate and the pin is inserted into the mounting aperture. The interlocking armature and pin secure the tooling plate to the base plate. The pin and armature lip have cooperating chamfered cam surfaces that move the lip into the locking aperture when the pin is inserted into the mounting aperture. The assembly includes a spring biased button that can be depressed to move the armature out of the pin so that the tooling plate can be released from the base plate.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is an exploded view of a tooling plate of the present invention;

FIG. 2 is a cross-sectional view of a pin extending from a tooling plate;

FIG. 3 is a cross-sectional view showing the tooling plate being mounted to the base plate;

FIG. 4 is a cross-sectional view showing the tooling plate mounted to the base plate;

FIG. 5 is a cross sectional viewing showing an alternate pin embodiment.

DETAILED DESCRIPTION OF THE INVENTION

Referring to the drawings more particularly by reference numbers, FIG. 1 shows a tooling plate 10 of a mounting assembly. The tooling plate 10 typically supports a work piece 12 such as a printed circuit board. Although a printed circuit board 12 is shown and described, it is to be understood that the tooling plate 10 can support any item.

As shown in FIG. 2, extending from a bottom surface 14 of the tooling plate 10 is a first pin 16. The first pin 16 has a locking aperture 18 located essentially perpendicular to the longitudinal axis of the pin. At the end of the first pin 16 is a first chamfered cam surface 20. The first pin 16 may be secured to the tooling plate 10 by a second pin 22. The second pin 22 is located off-center from the first pin 16 so that the locking aperture 18 is properly aligned with the mating armature. The pins 16 and 22 are preferably pressed into corresponding holes 24 of the tooling plate 10.

FIG. 1 shows a base plate 26 of the mounting assembly. The base plate 26 has a mounting aperture 28 that receives the first pin 16 of the tooling plate 10. The base plate 26 also has a channel 30 that receives an armature 32. The armature 32 has a lip 34 that extends into an inner opening 36 which receives the pin 16.

The lip 34 has a second chamfered cam surface 38. The armature 32 is typically enclosed and captured by a cover plate 40 that is mounted to the base plate 26 by fasteners 42. Attached to one end of the armature 32 is a button 44 that can be depressed by the user to move the lip 34 out of the pin 16. The button 44 is biased by a spring 46 and secured to the armature 32 by a set screw 48. The armature 32 moves within the channel 30 between a first position and a second position. The first cam surface 20 engages the second cam surface 38 when the pin 16 is inserted into the aperture 28. The second cam surface 38 slides relative to the first surface 20 so that the armature 32 moves from the first position to the second position.

As shown in FIG. 3, the tooling plate 10 is placed on top of the base plate 26 so that the first pin 16 is inserted into the mounting aperture 28. The first cam surface 20 engages the second cam surface 38 and pushes the armature 32 in a lateral direction. Further insertion of the first pin 16 into the mounting aperture 28 aligns the locking aperture 18 with the lip 34.

As shown in FIG. 4, the spring 46 pushes the lip 34 into the locking aperture 18 of the first pin 16 to secure the tooling plate 10 to the base plate 26. A production process such as machining, welding, etc. can then be performed on the work piece 12. After the process is completed the tooling plate 10 can be removed from the base plate 26 by depressing the button 44. The button 44 moves the lip 34 out of the locking aperture 18 of the first pin 16. The tooling plate 10 can be pulled away from the base plate 26 when the lip 34 is fully disengaged from the pin 16. The button 44 is released and the spring 46 moves the armature 32 back to the original position.

The present invention thus provides a mounting assembly that allows a tooling plate to be attached to a base plate by merely placing the plates together, and provides a subsequent release by a mere push of a button. The quick connect and release capabilities of the present mounting system reduce the "downtime" of the production process and the overall cost of the part.

FIG. 5 shows an alternate embodiment of a pin 16' that has an annular notch 50 that receives a corresponding lip 34' of the armature 32. A pin 16' with a notch 50 may be less expensive to manufacture than a pin 16 with a hole 18. The pin 16' may have a conical tip 52 that provides a cam surface that interacts with the cam surface of the armature 32.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A tool plate mounting system for a tooling plate, comprising:

a pin that extends from the tooling plate;

a base plate which has a mounting aperture that receives said pin;

an armature that moves relative to said base plate, said armature engages and captures said pin when said pin is inserted into said mounting aperture of said base plate to secure the tooling plate to said base plate; and, a button that can be depressed to disengage said armature from said pin so that the tooling plate can be separated from said base plate.

2. The system as recited in claim 1, further comprising a spring that biases said armature.

3. The system as recited in claim 1, wherein said armature and said pin each have a cam surface that cooperate to move said armature so that a lip of said armature extends into a locking aperture of said pin.

4. The system as recited in claim 1, wherein said armature and said pin each have a cam surface that cooperate to move said armature so that a lip of said armature extends into a notch of said pin.

5. The system as recited in claim 3, wherein said pin is secured to the tooling plate by an alignment pin that aligns said locking aperture with said lip.

6. The system as recited in claim 4, wherein said pin is secured to the tooling plate by an alignment pin that aligns said notches with said lip.

7. A tool plate mounting system for a tooling plate, comprising:

a pin that extends from the tooling plate, said pin having a locking aperture and a first cam surface;

a base plate which has a mounting aperture that receives said pin;

an armature that moves relative to said base plate, said armature has a lip that has a second cam surface, when said pin is inserted into said mounting aperture said first cam surface engages said second cam surface to move said armature such that said lip is inserted into said locking aperture to secure the tooling plate to said base plate;

a button that can be depressed to move said lip out of said locking aperture so that the tooling plate can be separated from said base plate; and, a spring that biases said button.

8. The system as recited in claim 7, wherein said pin is secured to the tooling plate by an alignment pin that aligns said locking aperture with said lip.

* * * * *